United States Patent [19]

Jacob et al.

[11] 4,278,522

[45] Jul. 14, 1981

[54] APPARATUS FOR TREATING CONTAMINATED WATER

[75] Inventors: Gernot Jacob, Nussbaumen; Luciano Pelloni, Zurich, both of Switzerland

[73] Assignee: BBC Brown Boveri & Company Limited, Baden, Switzerland

[21] Appl. No.: 49,065

[22] Filed: Jun. 18, 1979

[30] Foreign Application Priority Data

Aug. 23, 1978 [CH] Switzerland ............................ 8913/78

[51] Int. Cl.³ ................... C25B 15/02; C25B 11/03; C25B 11/10
[52] U.S. Cl. ........................... 204/228; 204/231; 204/284; 204/290 R; 204/290 F
[58] Field of Search ............. 204/283, 284, 149, 152, 204/290 F, 290 K, 228, 231

[56] References Cited

U.S. PATENT DOCUMENTS

| | | | |
|---|---|---|---|
| 1,183,753 | 5/1916 | Moody | 204/149 |
| 2,773,025 | 12/1956 | Ricks et al. | 204/284 X |
| 2,872,405 | 2/1959 | Miller et al. | 204/290 K |
| 3,207,679 | 9/1965 | Schmidt | 204/290 K X |
| 3,249,520 | 5/1966 | Hermann | 204/231 X |
| 3,463,707 | 8/1969 | Gibson, Jr. et al. | 204/290 K |
| 3,600,286 | 8/1971 | Sabins | 204/119 |
| 3,632,498 | 1/1972 | Beer | 204/149 X |
| 3,793,173 | 2/1974 | Kawahata et al. | 204/149 |
| 3,813,321 | 5/1974 | Bastacky | 204/149 |
| 3,969,216 | 7/1976 | Barrett | 204/290 K X |
| 4,000,056 | 12/1976 | Kelleher | 204/284 X |
| 4,036,716 | 7/1977 | Hulthe | 204/231 X |
| 4,038,170 | 7/1977 | Rhees et al. | 204/290 K X |
| 4,064,035 | 12/1977 | Fukasawa | 204/290 K X |

Primary Examiner—D. R. Valentine
Attorney, Agent, or Firm—Burns, Doane, Swecker & Mathis

[57] ABSTRACT

An electroflotation device for treating contaminated water includes cathode electrodes which are self-cleaning with respect to lime deposits. Each anode electrode of the device is associated with a pair of cathode electrodes. During operation of the device, a negative potential is applied to only one of the two electrodes of each cathode pair, while the other electrode has either a zero potential or a weak positive potential applied thereto. The lime deposit formed on the non-negative electrode is dissolved by the action of the carbonic acid which is present in the water, through the formation of bicarbonates.

5 Claims, 2 Drawing Figures

APPARATUS FOR TREATING CONTAMINATED WATER

BACKGROUND OF THE INVENTION

The present invention relates to a device for treating contaminated water by means of electroflotation wherein cathode electrodes are arranged above anode electrodes. The present invention also relates to a process for operating a device of this type.

Devices for treating contaminated water by means of electroflotation are known, for example, from Norwegian Patent Specification No. 92,995. In these known devices, the anode electrodes and cathode electrodes are located on the bottom of a flotation cell. The gas bubbles formed during electrolysis of the water, particularly hydrogen bubbles, attach themselves to the suspended matter present in the water, giving the suspended matter a relative density lower than that of water and carrying it to the surface. The floating materials are then skimmed from the surface of the water.

In these known devices, the electrodes, and in particular the cathode electrodes, must be cleaned approximately every 2 weeks. This is due to the fact that the effluent is almost always calcareous and extensive lime deposits form on the cathode electrodes. As the deposits form, the energy consumption of the device increases steadily since the voltage must be raised continuously in order to ensure constant current through the electrodes. To clean these known flotation cells, the cells must be emptied and the electrodes must be taken out.

OBJECT AND BRIEF SUMMARY OF THE INVENTION

It is therefore an object of the present invention to provide a novel device for treating contaminated water by means of electroflotation wherein the electrodes are self-cleaning, to thereby reduce the need to empty the flotation cell and to remove the electrodes to clean the cathode electrodes.

It is another object of the present invention to provide a novel process for operating a device of this type.

In accordance with the present invention, a pair of cathode electrodes are associated with each anode electrode. The cathodes of each pair are alternately supplied with a negative potential. Each cathode is cleaned by the action of the carbonic acid present in the water during the time period in which no negative potential is applied thereto.

In accordance with a further feature of the present invention, each of the anode and cathode electrodes are elongated and cylindrical in shape and are arranged to form a grid-like screen. Every other cathode electrode is connected to a respective conductor bar, to facilitate the application of the negative potential alternately to one electrode in each pair of cathode electrodes.

The switching of the negative potential from one cathode electrode to the other in each pair can be carried out by means of a timer which carries out the switching operation at fixed time intervals. Alternatively, the switching can be carried out in response to an increase of the applied voltage over a predetermined value or a decrease in the electrode current below a predetermined value.

BRIEF DESCRIPTION OF THE DRAWINGS

Further advantages of the present invention are explained in the following text by reference to illustrative embodiments and in conjunction with accompanying drawings in which.

DETAILED DESCRIPTION

Figure 1:
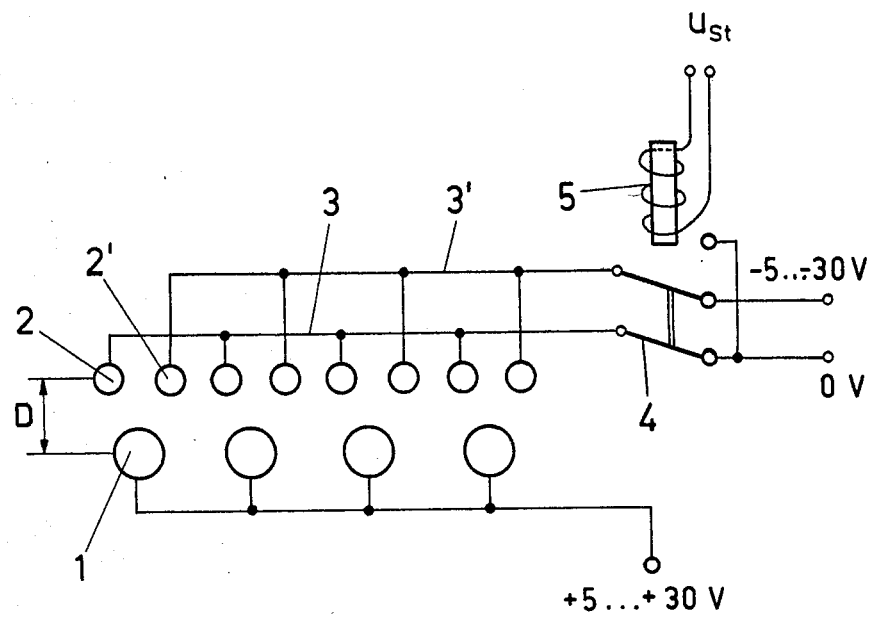
FIG. 1 diagrammatically illustrates the side view of several anode electrodes and cathode electrodes with the appropriate electrical connections.

The arrangement of the anode electrodes and cathode electrodes of a flotation cell is reproduced diagrammatically in FIG. 1. Each anode electrode 1 is associated with two cathode electrodes 2, 2'. The mean spacing D between the anode electrodes and the cathode electrodes can be, for example, 10 mm. It should be noted, however, that with increasing spacing D the voltage applied between the anode electrodes and cathode electrodes must also increase in order to maintain the required current density for the electrolysis process, for example 1–1.5 A/dm$^2$.

An electrical field distribution which is advantageous for the electrolysis process is obtained when the electrode rods 1, 2, 2' have a cylindrical shape. The diameter of the electrodes can be advantageously selected such that the surface area of the anode electrodes is at least equal to, and preferably twice the surface area of the cathode electrodes. Anode electrodes, having a diameter of about 8 to 10 mm and a mutual spacing of about 5 to 10 mm, and cathode electrodes having a diameter of about 3 to 4 mm have proven to be particularly suitable.

Suitable anode materials can be titanium or stainless steel coated with a layer of lead dioxide. Electrodes of this type have an advantage in that they do not dissolve during the electrolysis process.

Figure 2:
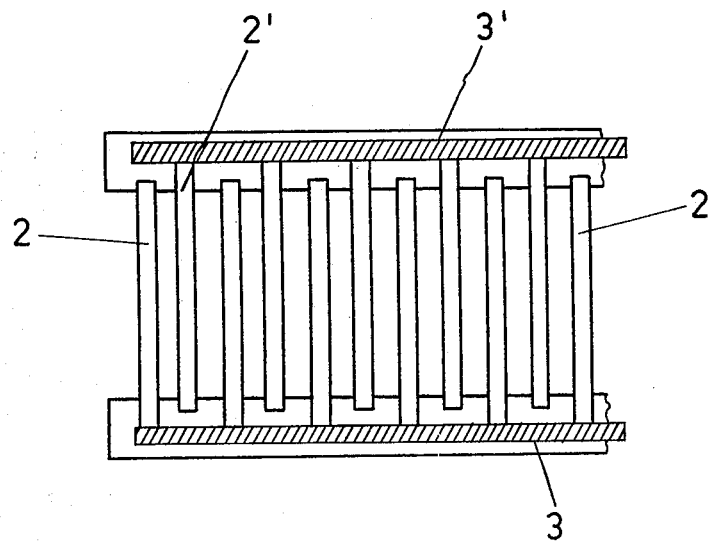
FIG. 2 is a plan view of a grid-like arrangement of several rod-shaped cathode electrodes.

Every second cathode electrode 2 or 2' is connected to a common conductor bar 3 or 3', respectively, as shown in FIGS. 1 and 2. A negative potential is applied in each case to only one of the two conductor bars of each pair, while the other conductor bar in each case is either at zero potential or has a weak positive potential applied thereto. After a certain interval of time, the potentials on the two conductor bars are interchanged by means of a switch device 4.

The switch-over of the cathode potentials can be effected with the aid of a time switch (not shown) operating at fixed intervals. Alternatively, constant current units can be used to control the switching operation, wherein the switch-over is initiated in such a way that after a predetermined rise in voltage (and hence a defined fouling of the cathode electrode), a signal $U_{st}$ is automatically applied to a switch-over relay 5, to carry out the switching operation. In constant voltage units, a drop in current due to fouling of the cathodes can trigger the switch-over relay 5 in a similar manner.

The fouled electrodes which are not connected to the voltage source are cleaned since the deposits on the electrodes are dissolved as bicarbonates by the carbonic acid dissolved in the water ($CaCO_3 + H_2CO_3 \rightarrow Ca^{++} + 2HCO_3$). Carbonic acid is virtually always present in the water, or it is formed by the decomposition of bicarbonate on the anode during the electrolysis process. Protons generated in the anode zone also have a dissolving action on the precipitate ($CaCO_3 + 2H^+ \rightarrow Ca^{++} + H_2O + CO_2$), provided the distance from the idle cathode is not too large.

In one application of the present invention using a flotation cell having an active cell capacity of 17 liters and using a screen-like cathode grid constructed as shown in FIG. 2, water having a total hardness of 22d and a carbonate hardness of 18d had its carbonate hardness reduced by 17d with a water throughput of 60 liters/hour. Considerable amounts of calcium carbonate flaked off the cathode rods which were potential-free and fell to the bottom. The calcium carbonate was detached substantially more rapidly when current was passing through the other cathode electrode than only in running water alone, i.e. without electrolysis. At a constant voltage of 21.5 V with a current density of 1.2 A/dm$^2$, the current did not fall for a period of about 120 hours. The potentials were switched over between cathodes every 30 minutes. If, however, the unit was operated in the known manner, i.e. the same negative potential was applied to all the cathode rods 2, 2', the current fell after 24 hours from an initial value of 10 A to 6 A.

The present invention may be embodied in other specific forms without departing from the spirit or essential characteristics thereof. The presently disclosed embodiment is therefore considered in all respects as illustrative and not restrictive. The scope of the invention is indicated by the appended claims rather than the foregoing description, and all changes which come within the meaning and range of equivalency of the claims are therefore intended to be embraced therein.

What is claimed is:

1. Apparatus for treating contaminated water by means of electroflotation; comprising:
    a multiplicity of positively biased anode electrodes each having a cylindrical shape;
    a pair of cylindrically shaped cathode electrodes respectively associated with each anode electrode said cathode and anode electrodes forming a grid-like screen, further wherein every second cathode electrode in said screen is connected to a common conductor bar; and
    means for alternately applying a negative potential to only one of the cathode electrodes in each pair of cathode electrodes while maintaining the other of said cathode electrodes at a non-negative potential.

2. Apparatus according to claim 1, wherein the anode electrode consists of titanium provided with a coating of lead dioxide.

3. Apparatus according to claim 1, wherein the anode electrode consists of stainless steel provided with a coating of lead dioxide.

4. Apparatus according to claim 1, wherein the surface area of the anode electrode is at least equal to the surface area of each of the cathode electrodes.

5. Apparatus according to claim 4, wherein the surface area of the anode electrode is twice the surface area of each of the cathode electrodes.

* * * * *